(12) United States Patent
Yoon et al.

(10) Patent No.: US 7,678,470 B2
(45) Date of Patent: Mar. 16, 2010

(54) REINFORCED MATRIX FOR MOLTEN CARBONATE FUEL CELL USING POROUS ALUMINUM SUPPORT AND METHOD FOR PREPARING THE MOLTEN CARBONATE FUEL CELL COMPRISING THE REINFORCED MATRIX

(75) Inventors: Sung Pil Yoon, Seongnam-si (KR); Seong Ahn Hong, Seoul (KR); In Hwan Oh, Seoul (KR); Tae Hoon Lim, Seoul (KR); Suk-Woo Nam, Seoul (KR); Heung Yong Ha, Seoul (KR); Jonghee Han, Seoul (KR); Eun Ae Cho, Seoul (KR); Jaeyoung Lee, Incheon (KR)

(73) Assignee: Korea Institute of Science and Technology (KR)

( * ) Notice: Subject to any disclaimer, the term of this patent is extended or adjusted under 35 U.S.C. 154(b) by 800 days.

(21) Appl. No.: 11/208,175

(22) Filed: Aug. 19, 2005

(65) Prior Publication Data

US 2006/0204770 A1    Sep. 14, 2006

(30) Foreign Application Priority Data

Mar. 14, 2005    (KR) ............... 10-2005-0020973

(51) Int. Cl.
*B32B 3/24* (2006.01)
*B32B 15/04* (2006.01)
*B32B 15/20* (2006.01)
*H01M 8/14* (2006.01)

(52) U.S. Cl. ............... 428/566; 428/613; 428/650; 429/46

(58) Field of Classification Search ............... None
See application file for complete search history.

(56) References Cited

U.S. PATENT DOCUMENTS

| | | | | | |
|---|---|---|---|---|---|
| 4,251,600 | A | * | 2/1981 | Sim et al. | 429/12 |
| 4,992,341 | A | * | 2/1991 | Smith et al. | 429/40 |
| 5,354,627 | A | * | 10/1994 | Hatoh et al. | 429/40 |
| 5,478,663 | A | * | 12/1995 | Cipollini et al. | 429/35 |
| 5,589,287 | A | * | 12/1996 | Hatoh et al. | 429/41 |

(Continued)

FOREIGN PATENT DOCUMENTS

JP    61-024164    *    2/1986

(Continued)

*Primary Examiner*—Jennifer McNeil
*Assistant Examiner*—Jason L Savage
(74) *Attorney, Agent, or Firm*—Cantor Colburn LLP

(57) ABSTRACT

Disclosed is a reinforced matrix for a molten carbonate fuel cell comprising a porous aluminum support and a lithium aluminate tape-cast on the porous aluminum support. Further, disclosed is a method for preparing the molten carbonate fuel cell comprising the reinforced matrix comprising steps of tape-casting a lithium aluminate on a porous aluminum support so as to prepare a reinforced matrix (S1), making a unit cell or a stack of the unit cells using the reinforced matrix (S2) and heat treating the unit cell or the stack so as to oxidize aluminum in the support into lithium aluminate (S3). According to the present invention, the method is simple and economic, and the mass production of the matrix is easy, and strength of the matrix can be increased effectively and therefore there is no worry about fracture or crack.

4 Claims, 1 Drawing Sheet

U.S. PATENT DOCUMENTS

| | | | |
|---|---|---|---|
| 5,869,203 A * | 2/1999 | Huang et al. | 429/46 |
| 6,153,257 A * | 11/2000 | Hong et al. | 427/115 |
| 6,290,928 B1 * | 9/2001 | Takahashi et al. | 423/600 |
| 6,296,972 B1 * | 10/2001 | Hong et al. | 429/223 |
| 6,340,454 B1 * | 1/2002 | Nakaoka et al. | 423/600 |
| 6,824,913 B2 * | 11/2004 | Oh et al. | 429/41 |
| 2001/0053475 A1 * | 12/2001 | Ying et al. | 429/137 |
| 2004/0146736 A1 * | 7/2004 | Ivanov et al. | 428/609 |
| 2006/0257722 A1 * | 11/2006 | Hilmi et al. | 429/46 |

FOREIGN PATENT DOCUMENTS

| | | | |
|---|---|---|---|
| JP | 63-086362 | * | 4/1988 |
| JP | 03-056631 | * | 3/1991 |

* cited by examiner

REINFORCED MATRIX FOR MOLTEN CARBONATE FUEL CELL USING POROUS ALUMINUM SUPPORT AND METHOD FOR PREPARING THE MOLTEN CARBONATE FUEL CELL COMPRISING THE REINFORCED MATRIX

BACKGROUND OF THE INVENTION

1. Field of the Invention

The present invention relates to a reinforced matrix for a molten carbonate fuel cell using a porous aluminum support and to a method for preparing the molten carbonate fuel cell comprising the reinforced matrix.

2. Description of the Related Art

A matrix in a molten carbonate fuel cell (MCFC) serves to prevent a cross-over of a reaction gas, to provide a conduction channel of a $CO_3^{2-}$ ion with a molten carbonate impregnated in the porous structure of the matrix and to insulate a cathode and an anode electrically.

Since the matrix is not an element participating in an electrochemical reaction but serves just as a support for an electrolyte, a pore size, a porosity, a stability for the electrolyte and a mechanical strength are very important in the matrix.

In particular, fracture and crack of the matrix due to a difference between coefficients of thermal expansion of the matrix and of the electrolyte according to a thermal cycle, and a change of a micro structure due to a long time operation are main causes of a degradation of performance and a reduction of life of a unit cell.

To solve the above problems, there have been suggested methods of dispersing a secondary phase of ceramic fibers or coarse particles as a retardant of crack propagation in $\gamma$-$LiAlO_2$ matrix to reinforce the matrix. As a result, it is known that an addition of alumina fibers is relatively efficient for reinforcing the matrix.

However, it is very expensive to manufacture the matrix using the alumina fibers. In view of that, the method using the alumina fibers is not suitable for a commercialization of the MCFC.

SUMMARY OF THE INVENTION

Accordingly, the present invention has been made to solve the above-mentioned problems occurring in the prior art. The object of the present invention is to provide a reinforced matrix for a molten carbonate fuel cell using a porous aluminum support and a method for preparing the molten carbonate fuel cell comprising the reinforced matrix, where the method is simple and economic contrary to the prior art which uses the alumina fibers and takes very high costs, and where the mass production of the matrix is easy, and where strength of the matrix can be increased effectively and therefore there is no worry about fracture or crack.

In order to accomplish the object, there is provided a reinforced matrix for a molten carbonate fuel cell comprising a porous aluminum support, and a lithium aluminate, which is tape-cast on the porous aluminum support.

In the reinforced matrix for a molten carbonate fuel cell according to the present invention, the porous aluminum support is a reticulate aluminum support.

In the reinforced matrix for a molten carbonate fuel cell according to the present invention, the porous aluminum support is an aluminum support having a three-dimensional network structure.

In order to achieve the above object, there is provided a method for preparing a molten carbonate fuel cell comprising steps of tape-casting a lithium aluminate on a porous aluminum support so as to prepare a reinforced matrix (S1); making a unit cell or a stack of the unit cells using the reinforced matrix (S2); and heat treating the unit cell or the stack so as to oxidize the aluminum in the support into the lithium aluminate (S3).

In the method according to the present invention, the porous aluminum support is a reticulate aluminum support.

In the method according to the present invention, the porous aluminum support is an aluminum support having a three-dimensional network structure.

DETAILED DESCRIPTION OF THE PREFERRED EMBODIMENTS

Hereinafter, the present invention will be described in detail with reference to the accompanying drawings.

According to the invention, lithium aluminate is tape-cast on a porous aluminum support, preferably a reticulate aluminum support, and more preferably an aluminum support having a three-dimensional network structure, so that it is possible to increase a strength of a matrix highly while maintaining a porosity and a pore size of the matrix to a level equal to those of the prior matrix.

In addition, since the support is made of inexpensive aluminum, it is possible to prepare the matrix economically.

Also, since it is possible to react the aluminum in the matrix with an electrolyte and thus to in-situ oxidize the aluminum into lithium aluminate by heat-treating a unit cell or a stack of the unit cells comprising the matrix, it is possible to make a overall material of the reinforced matrix be equal and thus to minimize a strength reduction of the matrix due to corrosion or a difference between the coefficients of thermal expansion.

EXAMPLE

Preparation

A tape casting slurry was prepared with a composition of lithium aluminate powders 32%, PVB B76 binder 10.5%, plasticizer DBP 9%, disperant (Solsperse 9000) 0.5%, defoamer (DAPPO-348) 1.0%, ethanol solvent 47%, by weight percent.

The sample powders, disperant and defoamer were primarily mixed in the ethanol solvent for 24 hours, and then the binder and plasticizer were added in the primarily mixed solution and then they were secondarily mixed for 6 days.

In the prepared slurry, pores inevitably formed by air to be introduced in a milling process and solvent vapors to be generated due to the vapor pressure of the solvent. Accordingly, in order to prevent the generation of the pores, de-airing from the slurry solution was preformed using a rotary evaporator. Further, the de-airing was performed so that the viscosity of the slurry became 5,000~10,000 cP, which is suitable for a tape-casting process.

A reticulate aluminum support (300 mesh) (Example 1) or a aluminum support having a three-dimensional network structure (Example 2, an average size of pores is 1 mm) was placed on a Mylar film (glycol terephthalic acid polyester) having a thickness of 125 µm and a silicon resin coated on a surface thereof, and then lithium aluminate was tape-cast so that the film could have a thickness which is about 1.5 times as thick as that of the aluminum support. As a result, obtained a reinforced matrix as shown in FIGS. 1 and 2.

Figure 1:
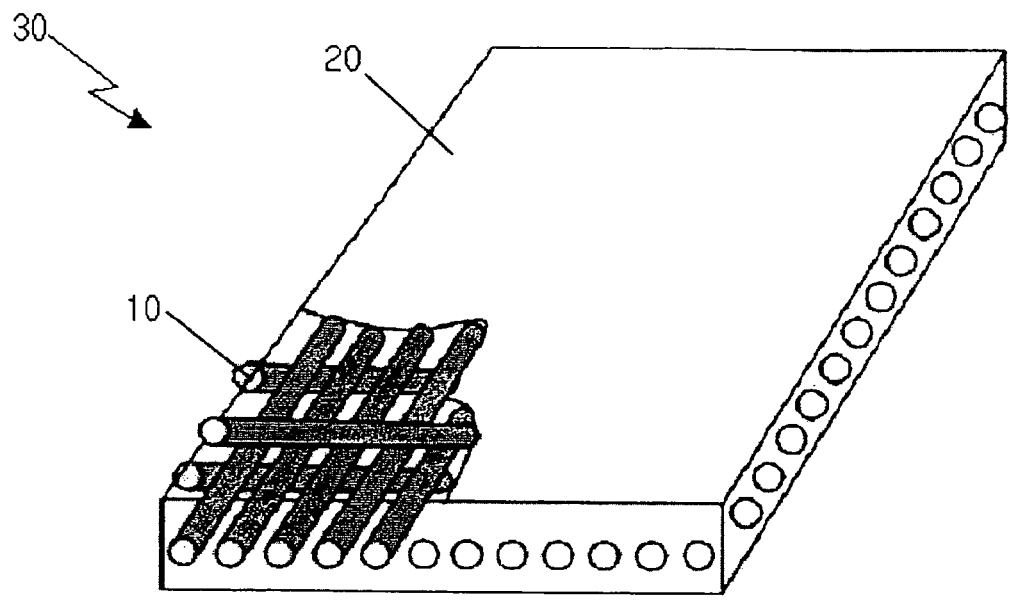
FIG. 1 is a schematic view showing a reinforced matrix for a molten carbonate fuel cell wherein lithium aluminate is tape-cast on a reticulate aluminum support according to the first example of the invention.

FIG. 1 is a schematic view showing a reinforced matrix for a molten carbonate fuel cell wherein lithium aluminate is tape-cast on a reticulate aluminum support according to the first example of the invention.

As shown in FIG. 1, a reinforced matrix 30 according to the first example of the invention comprises lithium aluminate 20 tape-cast on a reticulate aluminum support 10. Aluminum in the reticulate aluminum support 10 reacts with an electrolyte at an operating condition and thus becomes oxidized into lithium aluminate.

Figure 2:
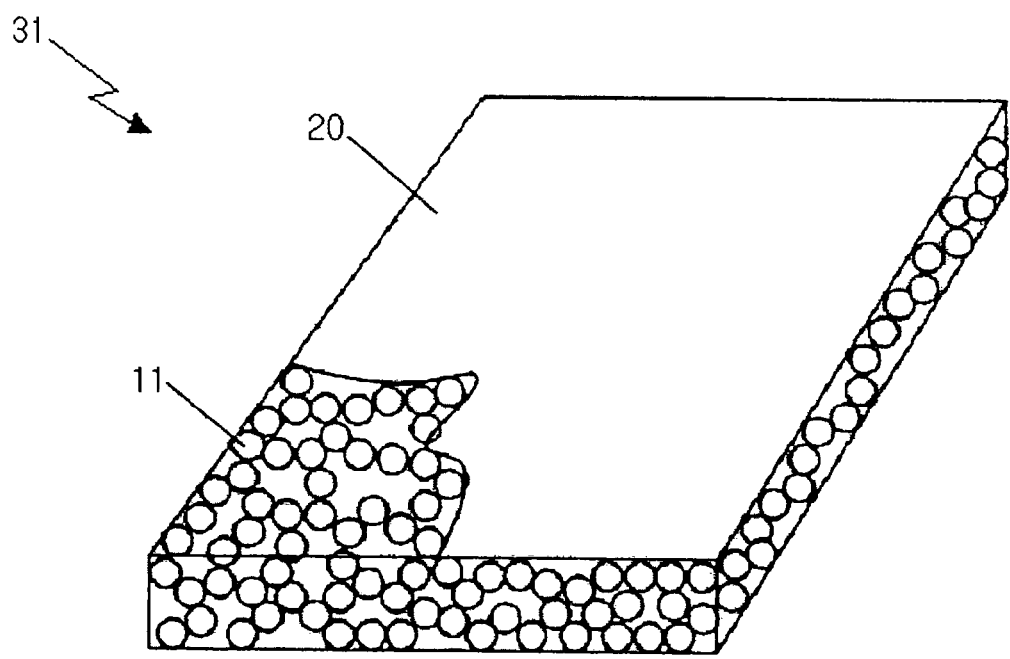
FIG. 2 is a schematic view showing a reinforced matrix for a molten carbonate fuel cell wherein lithium aluminate is tape-cast on an aluminum support having a three-dimensional network structure according to the second example of the invention.

FIG. 2 is a schematic view showing a reinforced matrix for a molten carbonate fuel cell wherein lithium aluminate is tape-cast on an aluminum support having a three-dimensional network structure according to the second example of the invention.

As shown in FIG. 2, a reinforced matrix 31 according to the second example of the invention comprises lithium aluminate 20 tape-cast on the aluminum support 11 having a three-dimensional network structure. Aluminum in the aluminum support 11 having the three-dimensional network structure reacts with an electrolyte at an operating condition and thus becomes oxidized into lithium aluminate.

Measurements and Results

The matrixes (example 1 and example 2) reinforced with the reticulate aluminum support or the aluminum support having the three-dimensional network structure and a matrix reinforced with general alumina fibers (comparative example) were sintered under air atmosphere at 650° C., and then three-points bending strength test was performed for the respective matrixes.

The reinforced matrix prepared according to the first example exhibited about five times bending strength (0.5 Kgf/mm$^2$) compared to a bending strength (0.1 Kgf/mm$^2$) of the matrix having general alumina fibers added thereto.

The reinforced matrix prepared according to the second example exhibited about ten times bending strength (1.0 Kgf/mm$^2$) compared to the bending strength (0.1 Kgf/mm$^2$) of the matrix having general alumina fibers added thereto.

As described above, according to the invention, it is possible to efficiently reinforce a matrix for a molten carbonate fuel cell. In addition, the method for preparing the matrix is simple, economic and suitable for a mass production. In particular, it is possible to increase the bending strength to about 10 times or more compared to that of the prior matrix while maintaining the porosity and the pore size to be equal to those of the prior matrix. In addition, the cost for the method is inexpensive since the support is made of inexpensive aluminum. Further, since the aluminum reacts with the electrolyte when heat-treating of a unit cell or a stack of the unit cells comprising the matrix and thus becomes oxidized into lithium aluminate, it is possible to make a overall material of the reinforced matrix be equal and thus to minimize a strength reduction of the matrix due to corrosion or a difference between the coefficients of thermal expansion.

Many alterations and modifications may be made by those having ordinary skill in the art without departing from the spirit and scope of the invention. Therefore, it must be understood that the embodiment and example described above should not be taken as limiting the invention as defined by the following claims. The claims are thus to be understood to include what is specifically described above, what is conceptionally equivalent, what can be obviously substituted and also what essentially incorporates the essential idea of he invention.

What is claimed is:

1. A reinforced matrix for a molten carbonate fuel cell comprising:
   a porous reticulate aluminum support consisting of aluminum; and
   a lithium aluminate, which is tape-cast on the porous support.

2. The reinforced matrix according to claim 1, wherein the porous reticulate aluminum support is a 300 mesh porous reticulate aluminum support.

3. A reinforced matrix for a molten carbonate fuel cell comprising:
   a porous aluminum support having a three dimensional network structure and consisting of aluminum; and
   a lithium aluminate, which is tape-cast on the porous support.

4. The reinforced matrix according to claim 3, wherein the porous aluminum support is a porous aluminum support having a three-dimensional network structure, where an average pore size of the porous aluminum support is 1 mm.

* * * * *